US 11,943,146 B2

(12) United States Patent
Simlai et al.

(10) Patent No.: US 11,943,146 B2
(45) Date of Patent: Mar. 26, 2024

(54) TRAFFIC PRIORITIZATION IN SD-WAN

(71) Applicant: VMware LLC, Palo Alto, CA (US)

(72) Inventors: Ananya Simlai, London (GB); Ramkumar Venketaramani, Sunnyvale, CA (US)

(73) Assignee: VMware LLC, Palo Alto, CA (US)

( * ) Notice: Subject to any disclaimer, the term of this patent is extended or adjusted under 35 U.S.C. 154(b) by 121 days.

(21) Appl. No.: 17/695,264

(22) Filed: Mar. 15, 2022

(65) Prior Publication Data
US 2023/0105680 A1  Apr. 6, 2023

(30) Foreign Application Priority Data
Oct. 1, 2021 (IN) ............................ 202141044684

(51) Int. Cl.
*H04L 47/2491* (2022.01)
*H04L 47/2441* (2022.01)
*H04L 69/22* (2022.01)

(52) U.S. Cl.
CPC ...... *H04L 47/2491* (2013.01); *H04L 47/2441* (2013.01); *H04L 69/22* (2013.01)

(58) Field of Classification Search
CPC . H04L 47/24; H04L 47/2408; H04L 47/2425; H04L 47/2433; H04L 47/2441; H04L 47/2475; H04L 47/2483; H04L 47/2491; H04L 69/22
See application file for complete search history.

(56) References Cited

U.S. PATENT DOCUMENTS

| | | | |
|---|---|---|---|
| 5,652,751 | A | 7/1997 | Sharony |
| 5,909,553 | A | 6/1999 | Campbell et al. |
| 6,154,465 | A | 11/2000 | Pickett |
| 6,157,648 | A | 12/2000 | Voit et al. |
| 6,201,810 | B1 | 3/2001 | Masuda et al. |
| 6,363,378 | B1 | 3/2002 | Conklin et al. |
| 6,445,682 | B1 | 9/2002 | Weitz |

(Continued)

FOREIGN PATENT DOCUMENTS

| | | |
|---|---|---|
| CN | 1483270 A | 3/2004 |
| CN | 1926809 A | 3/2007 |

(Continued)

OTHER PUBLICATIONS

Non-Published Commonly Owned U.S. Appl. No. 18/083,536, filed Dec. 18, 2022, 27 pages, VMware, Inc.

(Continued)

*Primary Examiner* — Kevin D Mew
(74) *Attorney, Agent, or Firm* — Quarles & Brady LLP

(57) ABSTRACT

Some embodiments provide a method, for a software-defined wide area network (SD-WAN) that handles (i) traffic for a 5G network and (ii) traffic outside of the 5G network. The SD-WAN is established by a set of edge nodes and a set of gateways. At a particular edge node of the SD-WAN, the method identifies whether a received data message is a 5G message that includes a tunnel header of a particular type associated with the 5G network. When the data message is a 5G message, the method examines a set of header fields within the tunnel header to identify a specified traffic priority applicable to the 5G message. The method applies the identified traffic priority within the SD-WAN.

24 Claims, 7 Drawing Sheets

(56) References Cited

U.S. PATENT DOCUMENTS

| | | |
|---|---|---|
| 6,744,775 B1 | 6/2004 | Beshai et al. |
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,373,660 B1 | 5/2008 | Guichard et al. |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,751,409 B1 | 7/2010 | Carolan |
| 7,962,458 B2 | 6/2011 | Holenstein et al. |
| 8,051,185 B2 | 11/2011 | Lee et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B2 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,516,129 B1 | 8/2013 | Skene |
| 8,566,452 B1 | 10/2013 | Goodwin et al. |
| 8,588,066 B2 | 11/2013 | Goel et al. |
| 8,630,291 B2 | 1/2014 | Shaffer et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,769,129 B2 | 7/2014 | Watsen et al. |
| 8,797,874 B2 | 8/2014 | Yu et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,855,071 B1 | 10/2014 | Sankaran et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,015,299 B1 | 4/2015 | Shah |
| 9,019,837 B2 | 4/2015 | Lue et al. |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,100,329 B1 | 8/2015 | Jiang et al. |
| 9,135,037 B1 | 9/2015 | Petrescu-Prahova et al. |
| 9,137,334 B2 | 9/2015 | Zhou |
| 9,154,327 B1 | 10/2015 | Marino et al. |
| 9,203,764 B2 | 12/2015 | Shirazipour et al. |
| 9,225,591 B2 | 12/2015 | Beheshti-Zavareh et al. |
| 9,306,949 B1 | 4/2016 | Richard et al. |
| 9,323,561 B2 | 4/2016 | Ayala et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Xu |
| 9,419,878 B2 | 8/2016 | Hsiao et al. |
| 9,432,245 B1 | 8/2016 | Sorenson et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,542,219 B1 | 1/2017 | Bryant et al. |
| 9,559,951 B1 | 1/2017 | Sajassi et al. |
| 9,563,423 B1 | 2/2017 | Pittman |
| 9,602,389 B1 | 3/2017 | Maveli et al. |
| 9,608,917 B1 | 3/2017 | Anderson et al. |
| 9,608,962 B1 | 3/2017 | Chang |
| 9,614,748 B1 | 4/2017 | Battersby et al. |
| 9,621,460 B2 | 4/2017 | Mehta et al. |
| 9,641,551 B1 | 5/2017 | Kariyanahalli |
| 9,648,547 B1 | 5/2017 | Hart et al. |
| 9,665,432 B2 | 5/2017 | Kruse et al. |
| 9,686,127 B2 | 6/2017 | Ramachandran et al. |
| 9,692,714 B1 | 6/2017 | Nair et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,747,249 B2 | 8/2017 | Cherian et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,819,540 B1 | 11/2017 | Bahadur et al. |
| 9,819,565 B2 | 11/2017 | Djukic et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,832,205 B2 | 11/2017 | Santhi et al. |
| 9,875,355 B1 | 1/2018 | Williams |
| 9,906,401 B1 | 2/2018 | Rao |
| 9,923,826 B2 | 3/2018 | Murgia |
| 9,930,011 B1 | 3/2018 | Clemons, Jr. et al. |
| 9,935,829 B1 | 4/2018 | Miller et al. |
| 9,942,787 B1 | 4/2018 | Tillotson |
| 9,996,370 B1 | 6/2018 | Khafizov et al. |
| 10,038,601 B1 | 7/2018 | Becker et al. |
| 10,057,183 B2 | 8/2018 | Salle et al. |
| 10,057,294 B2 | 8/2018 | Xu |
| 10,116,593 B1 | 10/2018 | Sinn et al. |
| 10,135,789 B2 | 11/2018 | Mayya et al. |
| 10,142,226 B1 | 11/2018 | Wu et al. |
| 10,178,032 B1 | 1/2019 | Freitas |
| 10,178,037 B2 | 1/2019 | Appleby et al. |
| 10,187,289 B1 | 1/2019 | Chen et al. |
| 10,200,264 B2 | 2/2019 | Menon et al. |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,263,848 B2 | 4/2019 | Wolting |
| 10,320,664 B2 | 6/2019 | Nainar et al. |
| 10,320,691 B1 | 6/2019 | Matthews et al. |
| 10,326,830 B1 | 6/2019 | Singh |
| 10,348,767 B1 | 7/2019 | Lee et al. |
| 10,355,989 B1 | 7/2019 | Panchal et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |
| 10,498,652 B2 | 12/2019 | Mayya et al. |
| 10,511,546 B2 | 12/2019 | Singarayan et al. |
| 10,523,539 B2 | 12/2019 | Mayya et al. |
| 10,550,093 B2 | 2/2020 | Ojima et al. |
| 10,554,538 B2 | 2/2020 | Spohn et al. |
| 10,560,431 B1 | 2/2020 | Chen et al. |
| 10,565,464 B2 | 2/2020 | Han et al. |
| 10,567,519 B1 | 2/2020 | Mukhopadhyaya et al. |
| 10,574,482 B2 | 2/2020 | Oré et al. |
| 10,574,528 B2 | 2/2020 | Mayya et al. |
| 10,594,516 B2 | 3/2020 | Cidon et al. |
| 10,594,591 B2 | 3/2020 | Houjyo et al. |
| 10,594,659 B2 | 3/2020 | El-Moussa et al. |
| 10,608,844 B2 | 3/2020 | Cidon et al. |
| 10,630,505 B2 | 4/2020 | Rubenstein et al. |
| 10,637,889 B2 | 4/2020 | Ermagan et al. |
| 10,666,460 B2 | 5/2020 | Cidon et al. |
| 10,666,497 B2 | 5/2020 | Tahhan et al. |
| 10,686,625 B2 | 6/2020 | Cidon et al. |
| 10,693,739 B1 | 6/2020 | Naseri et al. |
| 10,708,144 B2 | 7/2020 | Mohan et al. |
| 10,715,382 B2 | 7/2020 | Guan et al. |
| 10,715,427 B2 | 7/2020 | Raj et al. |
| 10,749,711 B2 | 8/2020 | Mukundan et al. |
| 10,778,466 B2 | 9/2020 | Cidon et al. |

(56) References Cited

U.S. PATENT DOCUMENTS

| | | | |
|---|---|---|---|
| 10,778,528 | B2 | 9/2020 | Mayya et al. |
| 10,778,557 | B2 | 9/2020 | Ganichev et al. |
| 10,805,114 | B2 | 10/2020 | Cidon et al. |
| 10,805,272 | B2 | 10/2020 | Mayya et al. |
| 10,819,564 | B2 | 10/2020 | Turabi et al. |
| 10,826,775 | B1 | 11/2020 | Moreno et al. |
| 10,841,131 | B2 | 11/2020 | Cidon et al. |
| 10,911,374 | B1 | 2/2021 | Kumar et al. |
| 10,924,388 | B1 | 2/2021 | Burns et al. |
| 10,938,693 | B2 | 3/2021 | Mayya et al. |
| 10,951,529 | B2 | 3/2021 | Duan et al. |
| 10,958,479 | B2 | 3/2021 | Cidon et al. |
| 10,959,098 | B2 | 3/2021 | Cidon et al. |
| 10,992,558 | B1 | 4/2021 | Silva et al. |
| 10,992,568 | B2 | 4/2021 | Michael et al. |
| 10,999,100 | B2 | 5/2021 | Cidon et al. |
| 10,999,137 | B2 | 5/2021 | Cidon et al. |
| 10,999,165 | B2 | 5/2021 | Cidon et al. |
| 10,999,197 | B2 | 5/2021 | Hooda et al. |
| 11,005,684 | B2 | 5/2021 | Cidon |
| 11,018,995 | B2 | 5/2021 | Cidon et al. |
| 11,044,190 | B2 | 6/2021 | Ramaswamy et al. |
| 11,050,588 | B2 | 6/2021 | Mayya et al. |
| 11,050,644 | B2 | 6/2021 | Hegde et al. |
| 11,071,005 | B2 | 7/2021 | Shen et al. |
| 11,089,111 | B2 | 8/2021 | Markuze et al. |
| 11,095,612 | B1 | 8/2021 | Oswal et al. |
| 11,102,032 | B2 | 8/2021 | Cidon et al. |
| 11,108,595 | B2 | 8/2021 | Knutsen et al. |
| 11,108,851 | B1 | 8/2021 | Kurmala et al. |
| 11,115,347 | B2 | 9/2021 | Gupta et al. |
| 11,115,426 | B1 | 9/2021 | Pazhyannur et al. |
| 11,115,480 | B2 | 9/2021 | Markuze et al. |
| 11,121,962 | B2 | 9/2021 | Michael et al. |
| 11,121,985 | B2 | 9/2021 | Cidon et al. |
| 11,128,492 | B2 | 9/2021 | Sethi et al. |
| 11,146,632 | B2 | 10/2021 | Rubenstein |
| 11,153,230 | B2 | 10/2021 | Cidon et al. |
| 11,171,885 | B2 | 11/2021 | Cidon et al. |
| 11,212,140 | B2 | 12/2021 | Mukundan et al. |
| 11,212,238 | B2 | 12/2021 | Cidon et al. |
| 11,223,514 | B2 | 1/2022 | Mayya et al. |
| 11,245,641 | B2 | 2/2022 | Ramaswamy et al. |
| 11,252,079 | B2 | 2/2022 | Michael et al. |
| 11,252,105 | B2 | 2/2022 | Cidon et al. |
| 11,252,106 | B2 | 2/2022 | Cidon et al. |
| 11,258,728 | B2 | 2/2022 | Cidon et al. |
| 11,310,170 | B2 | 4/2022 | Cidon et al. |
| 11,323,307 | B2 | 5/2022 | Mayya et al. |
| 11,349,722 | B2 | 5/2022 | Mayya et al. |
| 11,363,124 | B2 | 6/2022 | Markuze et al. |
| 11,374,904 | B2 | 6/2022 | Mayya et al. |
| 11,375,005 | B1 | 6/2022 | Rolando et al. |
| 11,381,474 | B1 | 7/2022 | Kumar et al. |
| 11,381,499 | B1 | 7/2022 | Ramaswamy et al. |
| 11,388,086 | B1 | 7/2022 | Ramaswamy et al. |
| 11,394,640 | B2 | 7/2022 | Ramaswamy et al. |
| 11,418,997 | B2 | 8/2022 | Devadoss et al. |
| 11,438,789 | B2 | 9/2022 | Devadoss et al. |
| 11,444,865 | B2 | 9/2022 | Ramaswamy et al. |
| 11,444,872 | B2 | 9/2022 | Mayya et al. |
| 11,477,127 | B2 | 10/2022 | Ramaswamy et al. |
| 11,489,720 | B1 | 11/2022 | Kempanna et al. |
| 11,489,783 | B2 | 11/2022 | Ramaswamy et al. |
| 11,509,571 | B1 | 11/2022 | Ramaswamy et al. |
| 11,516,049 | B2 | 11/2022 | Cidon et al. |
| 11,522,780 | B1 | 12/2022 | Wallace et al. |
| 11,526,434 | B1 | 12/2022 | Brooker et al. |
| 11,533,248 | B2 | 12/2022 | Mayya et al. |
| 11,552,874 | B1 | 1/2023 | Pragada et al. |
| 11,575,591 | B2 | 2/2023 | Ramaswamy et al. |
| 11,575,600 | B2 | 2/2023 | Markuze et al. |
| 11,582,144 | B2 | 2/2023 | Ramaswamy et al. |
| 11,582,298 | B2 | 2/2023 | Hood et al. |
| 11,582,820 | B2 * | 2/2023 | Gundavelli .......... H04L 61/103 |
| 11,601,356 | B2 | 3/2023 | Gandhi et al. |
| 11,606,225 | B2 | 3/2023 | Cidon et al. |
| 11,606,286 | B2 | 3/2023 | Michael et al. |
| 11,606,314 | B2 | 3/2023 | Cidon et al. |
| 11,606,712 | B2 | 3/2023 | Devadoss et al. |
| 11,611,507 | B2 | 3/2023 | Ramaswamy et al. |
| 11,637,768 | B2 | 4/2023 | Ramaswamy et al. |
| 11,677,720 | B2 | 6/2023 | Mayya et al. |
| 11,689,959 | B2 | 6/2023 | Devadoss et al. |
| 11,700,196 | B2 | 7/2023 | Michael et al. |
| 11,706,126 | B2 | 7/2023 | Silva et al. |
| 11,706,127 | B2 | 7/2023 | Michael et al. |
| 11,709,710 | B2 | 7/2023 | Markuze et al. |
| 11,716,286 | B2 | 8/2023 | Ramaswamy et al. |
| 11,722,925 | B2 | 8/2023 | Devadoss et al. |
| 11,729,065 | B2 | 8/2023 | Ramaswamy et al. |
| 2002/0049687 | A1 | 4/2002 | Helsper et al. |
| 2002/0075542 | A1 | 6/2002 | Kumar et al. |
| 2002/0085488 | A1 | 7/2002 | Kobayashi |
| 2002/0087716 | A1 | 7/2002 | Mustafa |
| 2002/0152306 | A1 | 10/2002 | Tuck |
| 2002/0186682 | A1 | 12/2002 | Kawano et al. |
| 2002/0198840 | A1 | 12/2002 | Banka et al. |
| 2003/0050061 | A1 | 3/2003 | Wu et al. |
| 2003/0061269 | A1 | 3/2003 | Hathaway et al. |
| 2003/0088697 | A1 | 5/2003 | Matsuhira |
| 2003/0112766 | A1 | 6/2003 | Riedel et al. |
| 2003/0112808 | A1 | 6/2003 | Solomon |
| 2003/0126468 | A1 | 7/2003 | Markham |
| 2003/0161313 | A1 | 8/2003 | Jinmei et al. |
| 2003/0161321 | A1 | 8/2003 | Karam et al. |
| 2003/0189919 | A1 | 10/2003 | Gupta et al. |
| 2003/0202506 | A1 | 10/2003 | Perkins et al. |
| 2003/0219030 | A1 | 11/2003 | Gubbi |
| 2004/0059831 | A1 | 3/2004 | Chu et al. |
| 2004/0068668 | A1 | 4/2004 | Lor et al. |
| 2004/0165601 | A1 | 8/2004 | Liu et al. |
| 2004/0224771 | A1 | 11/2004 | Chen et al. |
| 2005/0078690 | A1 | 4/2005 | DeLangis |
| 2005/0149604 | A1 | 7/2005 | Navada |
| 2005/0154790 | A1 | 7/2005 | Nagata et al. |
| 2005/0172161 | A1 | 8/2005 | Cruz et al. |
| 2005/0195754 | A1 | 9/2005 | Nosella |
| 2005/0210479 | A1 | 9/2005 | Andjelic |
| 2005/0265255 | A1 | 12/2005 | Kodialam et al. |
| 2006/0002291 | A1 | 1/2006 | Alicherry et al. |
| 2006/0034335 | A1 | 2/2006 | Karaoguz et al. |
| 2006/0114838 | A1 | 6/2006 | Mandavilli et al. |
| 2006/0171365 | A1 | 8/2006 | Borella |
| 2006/0182034 | A1 | 8/2006 | Klinker et al. |
| 2006/0182035 | A1 | 8/2006 | Vasseur |
| 2006/0193247 | A1 | 8/2006 | Naseh et al. |
| 2006/0193252 | A1 | 8/2006 | Naseh et al. |
| 2006/0195605 | A1 | 8/2006 | Sundarrajan et al. |
| 2006/0245414 | A1 | 11/2006 | Susai et al. |
| 2007/0050594 | A1 | 3/2007 | Augsburg et al. |
| 2007/0064604 | A1 | 3/2007 | Chen et al. |
| 2007/0064702 | A1 | 3/2007 | Bates et al. |
| 2007/0083727 | A1 | 4/2007 | Johnston et al. |
| 2007/0091794 | A1 | 4/2007 | Filsfils et al. |
| 2007/0103548 | A1 | 5/2007 | Carter |
| 2007/0115812 | A1 | 5/2007 | Hughes |
| 2007/0121486 | A1 | 5/2007 | Guichard et al. |
| 2007/0130325 | A1 | 6/2007 | Lesser |
| 2007/0162619 | A1 | 7/2007 | Aloni et al. |
| 2007/0162639 | A1 | 7/2007 | Chu et al. |
| 2007/0177511 | A1 | 8/2007 | Das et al. |
| 2007/0195797 | A1 | 8/2007 | Patel et al. |
| 2007/0237081 | A1 | 10/2007 | Kodialam et al. |
| 2007/0260746 | A1 | 11/2007 | Mirtorabi et al. |
| 2007/0268882 | A1 | 11/2007 | Breslau et al. |
| 2008/0002670 | A1 | 1/2008 | Bugenhagen et al. |
| 2008/0049621 | A1 | 2/2008 | McGuire et al. |
| 2008/0055241 | A1 | 3/2008 | Goldenberg et al. |
| 2008/0080509 | A1 | 4/2008 | Khanna et al. |
| 2008/0095187 | A1 | 4/2008 | Jung et al. |
| 2008/0117930 | A1 | 5/2008 | Chakareski et al. |
| 2008/0144532 | A1 | 6/2008 | Chamarajanagar et al. |
| 2008/0168086 | A1 | 7/2008 | Miller et al. |

(56) References Cited

U.S. PATENT DOCUMENTS

| | | |
|---|---|---|
| 2008/0175150 A1 | 7/2008 | Bolt et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2008/0263218 A1 | 10/2008 | Beerends et al. |
| 2009/0013210 A1 | 1/2009 | McIntosh et al. |
| 2009/0028092 A1 | 1/2009 | Rothschild |
| 2009/0125617 A1 | 5/2009 | Klessig et al. |
| 2009/0141642 A1 | 6/2009 | Sun |
| 2009/0154463 A1 | 6/2009 | Hines et al. |
| 2009/0182874 A1 | 7/2009 | Morford et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091782 A1 | 4/2010 | Hiscock |
| 2010/0091823 A1 | 4/2010 | Retana et al. |
| 2010/0098092 A1 | 4/2010 | Luo et al. |
| 2010/0100768 A1 | 4/2010 | Yamamoto et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0128600 A1 | 5/2010 | Srinivasmurthy et al. |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0001604 A1 | 1/2011 | Ludlow et al. |
| 2011/0007752 A1 | 1/2011 | Silva et al. |
| 2011/0032939 A1 | 2/2011 | Nozaki et al. |
| 2011/0035187 A1 | 2/2011 | DeJori et al. |
| 2011/0040814 A1 | 2/2011 | Higgins |
| 2011/0075674 A1 | 3/2011 | Li et al. |
| 2011/0078783 A1 | 3/2011 | Duan et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2011/0302663 A1 | 12/2011 | Prodan et al. |
| 2012/0008630 A1 | 1/2012 | Ould-Brahim |
| 2012/0027013 A1 | 2/2012 | Napierala |
| 2012/0039309 A1 | 2/2012 | Evans et al. |
| 2012/0099601 A1 | 4/2012 | Haddad et al. |
| 2012/0136697 A1 | 5/2012 | Peles et al. |
| 2012/0140935 A1 | 6/2012 | Kruglick |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shatzkamer et al. |
| 2012/0240185 A1 | 9/2012 | Kapoor et al. |
| 2012/0250682 A1 | 10/2012 | Vincent et al. |
| 2012/0250686 A1 | 10/2012 | Vincent et al. |
| 2012/0266026 A1 | 10/2012 | Chikkalingaiah et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0007505 A1 | 1/2013 | Spear |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103729 A1 | 4/2013 | Cooney et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128757 A1 | 5/2013 | Chowdhary et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173768 A1 | 7/2013 | Kundu et al. |
| 2013/0173788 A1 | 7/2013 | Song |
| 2013/0182712 A1 | 7/2013 | Aguayo et al. |
| 2013/0185446 A1 | 7/2013 | Zeng et al. |
| 2013/0185729 A1 | 7/2013 | Vasic et al. |
| 2013/0191688 A1 | 7/2013 | Agarwal et al. |
| 2013/0223226 A1 | 8/2013 | Narayanan et al. |
| 2013/0223454 A1 | 8/2013 | Dunbar et al. |
| 2013/0235870 A1 | 9/2013 | Tripathi et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0258939 A1 | 10/2013 | Wang |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0016464 A1 | 1/2014 | Shirazipour et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0122559 A1 | 5/2014 | Branson et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0157363 A1 | 6/2014 | Banerjee |
| 2014/0160935 A1 | 6/2014 | Zecharia et al. |
| 2014/0164560 A1 | 6/2014 | Ko et al. |
| 2014/0164617 A1 | 6/2014 | Jalan et al. |
| 2014/0164718 A1 | 6/2014 | Schaik et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0189074 A1 | 7/2014 | Parker |
| 2014/0208317 A1 | 7/2014 | Nakagawa |
| 2014/0219135 A1 | 8/2014 | Li et al. |
| 2014/0223507 A1 | 8/2014 | Xu |
| 2014/0226664 A1 | 8/2014 | Chen et al. |
| 2014/0229210 A1 | 8/2014 | Sharifian et al. |

(56) References Cited

U.S. PATENT DOCUMENTS

| | | |
|---|---|---|
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0310282 A1 | 10/2014 | Sprague et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0337674 A1 | 11/2014 | Ivancic et al. |
| 2014/0341109 A1 | 11/2014 | Cartmell et al. |
| 2014/0351394 A1 | 11/2014 | Elisha |
| 2014/0355441 A1 | 12/2014 | Jain |
| 2014/0365834 A1 | 12/2014 | Stone et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0100958 A1 | 4/2015 | Banavalikar et al. |
| 2015/0106809 A1 | 4/2015 | Reddy et al. |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0264055 A1 | 9/2015 | Budhani et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0326426 A1 | 11/2015 | Luo et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358232 A1 | 12/2015 | Chen et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381462 A1 | 12/2015 | Choi et al. |
| 2015/0381493 A1 | 12/2015 | Bansal et al. |
| 2016/0019317 A1 | 1/2016 | Pawar et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080268 A1 | 3/2016 | Anand et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134527 A1 | 5/2016 | Kwak et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0147607 A1 | 5/2016 | Dornemann et al. |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0205071 A1 | 7/2016 | Cooper et al. |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0234099 A1 | 8/2016 | Jiao |
| 2016/0234161 A1 | 8/2016 | Banerjee et al. |
| 2016/0255169 A1 | 9/2016 | Kovvuri et al. |
| 2016/0255542 A1 | 9/2016 | Hughes et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0299775 A1 | 10/2016 | Madapurath et al. |
| 2016/0301471 A1 | 10/2016 | Kunz et al. |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0337202 A1 | 11/2016 | Ben-Itzhak et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0024260 A1 | 1/2017 | Chandrasekaran et al. |
| 2017/0026273 A1 | 1/2017 | Yao et al. |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063783 A1 | 3/2017 | Yong et al. |

(56) References Cited

U.S. PATENT DOCUMENTS

| | | |
|---|---|---|
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118067 A1 | 4/2017 | Vedula |
| 2017/0118173 A1 | 4/2017 | Arramreddy et al. |
| 2017/0123939 A1 | 5/2017 | Maheshwari et al. |
| 2017/0126475 A1 | 5/2017 | Mahkonen et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0155566 A1 | 6/2017 | Martinsen et al. |
| 2017/0155590 A1 | 6/2017 | Dillon et al. |
| 2017/0163473 A1 | 6/2017 | Sadana et al. |
| 2017/0171024 A1 | 6/2017 | Anerousis et al. |
| 2017/0171310 A1 | 6/2017 | Gardner |
| 2017/0180220 A1 | 6/2017 | Leckey et al. |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201568 A1 | 7/2017 | Hussam et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0236060 A1 | 8/2017 | Ignatyev |
| 2017/0237710 A1 | 8/2017 | Mayya et al. |
| 2017/0242784 A1 | 8/2017 | Heorhiadi et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302501 A1 | 10/2017 | Shi et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317945 A1 | 11/2017 | Guo et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0324628 A1 | 11/2017 | Dhanabalan |
| 2017/0337086 A1 | 11/2017 | Zhu et al. |
| 2017/0339022 A1 | 11/2017 | Hegde et al. |
| 2017/0339054 A1 | 11/2017 | Yadav et al. |
| 2017/0339070 A1 | 11/2017 | Chang et al. |
| 2017/0346722 A1 | 11/2017 | Smith et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0041470 A1 | 2/2018 | Schultz et al. |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0091370 A1 | 3/2018 | Arai |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0123946 A1 | 5/2018 | Ramachandran et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0176252 A1 | 6/2018 | Nimmagadda et al. |
| 2018/0181423 A1 | 6/2018 | Gunda et al. |
| 2018/0205746 A1 | 7/2018 | Boutnaru et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0261085 A1 | 9/2018 | Liu et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0359323 A1 | 12/2018 | Madden |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0021085 A1 | 1/2019 | Mochizuki et al. |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0081894 A1 | 3/2019 | Yousaf et al. |
| 2019/0103990 A1 | 4/2019 | Cidon et al. |
| 2019/0103991 A1 | 4/2019 | Cidon et al. |

(56) References Cited

U.S. PATENT DOCUMENTS

| | | |
|---|---|---|
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0132234 A1 | 5/2019 | Dong et al. |
| 2019/0132322 A1 | 5/2019 | Song et al. |
| 2019/0140889 A1 | 5/2019 | Mayya et al. |
| 2019/0140890 A1 | 5/2019 | Mayya et al. |
| 2019/0149525 A1 | 5/2019 | Gunda et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0222499 A1 | 7/2019 | Chen et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0238497 A1 | 8/2019 | Tourrilhes et al. |
| 2019/0268421 A1 | 8/2019 | Markuze et al. |
| 2019/0268973 A1 | 8/2019 | Bull et al. |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0288875 A1 | 9/2019 | Shen et al. |
| 2019/0306197 A1 | 10/2019 | Degioanni |
| 2019/0306282 A1 | 10/2019 | Masputra et al. |
| 2019/0313278 A1 | 10/2019 | Liu |
| 2019/0313907 A1 | 10/2019 | Khachaturian et al. |
| 2019/0319847 A1 | 10/2019 | Nahar et al. |
| 2019/0319881 A1 | 10/2019 | Maskara et al. |
| 2019/0327109 A1 | 10/2019 | Guichard et al. |
| 2019/0334786 A1 | 10/2019 | Dutta et al. |
| 2019/0334813 A1 | 10/2019 | Raj et al. |
| 2019/0334820 A1 | 10/2019 | Zhao |
| 2019/0342201 A1 | 11/2019 | Singh |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1 | 12/2019 | Tahhan et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0044969 A1 | 2/2020 | Hao et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0067831 A1 | 2/2020 | Spraggins et al. |
| 2020/0092207 A1 | 3/2020 | Sipra et al. |
| 2020/0097327 A1 | 3/2020 | Beyer et al. |
| 2020/0099625 A1 | 3/2020 | Yigit et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0159661 A1 | 5/2020 | Keymolen et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0241927 A1 | 7/2020 | Yang et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0267203 A1 | 8/2020 | Jindal et al. |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0301764 A1 | 9/2020 | Thoresen et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0344089 A1 | 10/2020 | Motwani et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0403821 A1 | 12/2020 | Dev et al. |
| 2020/0412483 A1 | 12/2020 | Tan et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0021538 A1 | 1/2021 | Meck et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0037159 A1 | 2/2021 | Shimokawa |
| 2021/0049191 A1 | 2/2021 | Masson et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0073001 A1 | 3/2021 | Rogers et al. |
| 2021/0092062 A1 | 3/2021 | Dhanabalan et al. |
| 2021/0099360 A1 | 4/2021 | Parsons et al. |
| 2021/0105199 A1 | 4/2021 | H et al. |
| 2021/0111998 A1 | 4/2021 | Saavedra |
| 2021/0112034 A1 | 4/2021 | Sundararajan et al. |
| 2021/0126830 A1 | 4/2021 | R. et al. |

(56) References Cited

U.S. PATENT DOCUMENTS

| | | | |
|---|---|---|---|
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160169 A1 | 5/2021 | Shen et al. |
| 2021/0160813 A1 | 5/2021 | Gupta et al. |
| 2021/0176255 A1 | 6/2021 | Hill et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0204164 A1* | 7/2021 | Yavuz .................... H04L 47/83 |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0314385 A1 | 10/2021 | Pande et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0392171 A1 | 12/2021 | Srinivas et al. |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0400512 A1 | 12/2021 | Agarwal et al. |
| 2021/0409277 A1 | 12/2021 | Jeuk et al. |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0029902 A1 | 1/2022 | Shemer et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0045927 A1 | 2/2022 | Liu et al. |
| 2022/0052928 A1 | 2/2022 | Sundararajan et al. |
| 2022/0061059 A1 | 2/2022 | Dunsmore et al. |
| 2022/0086035 A1 | 3/2022 | Devaraj et al. |
| 2022/0094644 A1 | 3/2022 | Cidon et al. |
| 2022/0123961 A1 | 4/2022 | Mukundan et al. |
| 2022/0131740 A1 | 4/2022 | Mayya et al. |
| 2022/0131807 A1 | 4/2022 | Srinivas et al. |
| 2022/0131898 A1 | 4/2022 | Hooda et al. |
| 2022/0141184 A1 | 5/2022 | Oswal et al. |
| 2022/0158923 A1 | 5/2022 | Ramaswamy et al. |
| 2022/0158924 A1 | 5/2022 | Ramaswamy et al. |
| 2022/0158926 A1 | 5/2022 | Wennerström et al. |
| 2022/0166713 A1 | 5/2022 | Markuze et al. |
| 2022/0191719 A1 | 6/2022 | Roy |
| 2022/0198229 A1 | 6/2022 | López et al. |
| 2022/0210035 A1 | 6/2022 | Hendrickson et al. |
| 2022/0210041 A1 | 6/2022 | Gandhi et al. |
| 2022/0210042 A1 | 6/2022 | Gandhi et al. |
| 2022/0210122 A1 | 6/2022 | Levin et al. |
| 2022/0217015 A1 | 7/2022 | Vuggrala et al. |
| 2022/0231949 A1 | 7/2022 | Ramaswamy et al. |
| 2022/0231950 A1 | 7/2022 | Ramaswamy et al. |
| 2022/0232411 A1 | 7/2022 | Vijayakumar et al. |
| 2022/0239596 A1 | 7/2022 | Kumar et al. |
| 2022/0272033 A1* | 8/2022 | Jain .................... H04L 45/302 |
| 2022/0286391 A1* | 9/2022 | Agarwal .................. H04L 45/34 |
| 2022/0294701 A1 | 9/2022 | Mayya et al. |
| 2022/0335027 A1 | 10/2022 | Seshadri et al. |
| 2022/0337553 A1 | 10/2022 | Mayya et al. |
| 2022/0353152 A1 | 11/2022 | Ramaswamy |
| 2022/0353171 A1 | 11/2022 | Ramaswamy et al. |
| 2022/0353175 A1 | 11/2022 | Ramaswamy et al. |
| 2022/0353182 A1 | 11/2022 | Ramaswamy et al. |
| 2022/0353190 A1 | 11/2022 | Ramaswamy et al. |
| 2022/0360500 A1 | 11/2022 | Ramaswamy et al. |
| 2022/0407773 A1 | 12/2022 | Kempanna et al. |
| 2022/0407774 A1 | 12/2022 | Kempanna et al. |
| 2022/0407790 A1 | 12/2022 | Kempanna et al. |
| 2022/0407820 A1 | 12/2022 | Kempanna et al. |
| 2022/0407915 A1 | 12/2022 | Kempanna et al. |
| 2023/0006929 A1 | 1/2023 | Mayya et al. |
| 2023/0025586 A1 | 1/2023 | Rolando et al. |
| 2023/0026330 A1 | 1/2023 | Rolando et al. |
| 2023/0026865 A1 | 1/2023 | Rolando et al. |
| 2023/0028872 A1 | 1/2023 | Ramaswamy |
| 2023/0039869 A1 | 2/2023 | Ramaswamy et al. |
| 2023/0041916 A1 | 2/2023 | Zhang et al. |
| 2023/0054961 A1 | 2/2023 | Ramaswamy et al. |
| 2023/0121871 A1 | 4/2023 | Mayya et al. |
| 2023/0164158 A1 | 5/2023 | Fellows et al. |
| 2023/0179445 A1 | 6/2023 | Cidon et al. |
| 2023/0179502 A1 | 6/2023 | Ramaswamy et al. |
| 2023/0179521 A1 | 6/2023 | Markuze et al. |
| 2023/0179543 A1 | 6/2023 | Cidon et al. |
| 2023/0216768 A1 | 7/2023 | Zohar et al. |
| 2023/0216801 A1 | 7/2023 | Markuze et al. |
| 2023/0216804 A1 | 7/2023 | Zohar et al. |
| 2023/0221874 A1 | 7/2023 | Markuze et al. |
| 2023/0224356 A1 | 7/2023 | Markuze et al. |
| 2023/0224759 A1 | 7/2023 | Ramaswamy |
| 2023/0231845 A1 | 7/2023 | Manoharan et al. |
| 2023/0239234 A1 | 7/2023 | Zohar et al. |
| 2023/0261974 A1 | 8/2023 | Ramaswamy et al. |
| 2023/0308421 A1 | 9/2023 | Mayya et al. |

FOREIGN PATENT DOCUMENTS

| | | | |
|---|---|---|---|
| CN | 102577270 A | 7/2012 |
| CN | 102811165 A | 12/2012 |
| CN | 104205757 A | 12/2014 |
| CN | 104956329 A | 9/2015 |
| CN | 106230650 A | 12/2016 |
| CN | 106656847 A | 5/2017 |
| CN | 106998284 A | 8/2017 |
| CN | 110447209 A | 11/2019 |
| CN | 111198764 A | 5/2020 |
| EP | 1031224 B1 | 3/2005 |
| EP | 1912381 A1 | 4/2008 |
| EP | 2538637 A2 | 12/2012 |
| EP | 2763362 A1 | 8/2014 |
| EP | 3041178 A1 | 7/2016 |
| EP | 3297211 A1 | 3/2018 |
| EP | 3509256 A1 | 7/2019 |
| EP | 3346650 B1 | 11/2019 |
| JP | 2002368792 A | 12/2002 |
| JP | 2010233126 A | 10/2010 |
| JP | 2014200010 A | 10/2014 |
| JP | 2017059991 A | 3/2017 |
| JP | 2017524290 A | 8/2017 |
| KR | 20170058201 A | 5/2017 |
| RU | 2574350 C2 | 2/2016 |
| WO | 2000078004 A2 | 12/2000 |
| WO | 03073701 A1 | 9/2003 |
| WO | 2005071861 A1 | 8/2005 |
| WO | 2007016834 A1 | 2/2007 |
| WO | 2012167184 A2 | 12/2012 |
| WO | 2015092565 A1 | 6/2015 |
| WO | 2016061546 A1 | 4/2016 |
| WO | 2016123314 A1 | 8/2016 |
| WO | 2017083975 A1 | 5/2017 |
| WO | 2019070611 A1 | 4/2019 |
| WO | 2019094522 A1 | 5/2019 |
| WO | 2020012491 A1 | 1/2020 |
| WO | 2020018704 A1 | 1/2020 |
| WO | 2020091777 A1 | 5/2020 |
| WO | 2020101922 A1 | 5/2020 |
| WO | 2020112345 A1 | 6/2020 |
| WO | 2021040934 A1 | 3/2021 |
| WO | WO-2021040935 A1 * | 3/2021 | ......... G06F 9/45541 |
| WO | 2021118717 A1 | 6/2021 |

(56) References Cited

FOREIGN PATENT DOCUMENTS

| WO | 2021150465 A1 | 7/2021 |
| --- | --- | --- |
| WO | 2021211906 A1 | 10/2021 |
| WO | 2022005607 A1 | 1/2022 |
| WO | 2022082680 A1 | 4/2022 |
| WO | 2022154850 A1 | 7/2022 |
| WO | 2022159156 A1 | 7/2022 |
| WO | 2022231668 A1 | 11/2022 |
| WO | 2022235303 A1 | 11/2022 |
| WO | 2022265681 A1 | 12/2022 |
| WO | 2023009159 A1 | 2/2023 |

OTHER PUBLICATIONS

Non-Published Commonly Owned U.S. Appl. No. 18/102,685, filed Jan. 28, 2023, 124 pages, VMware, Inc.
Non-Published Commonly Owned U.S. Appl. No. 18/102,687, filed Jan. 28, 2023, 172 pages, VMware, Inc.
Non-Published Commonly Owned U.S. Appl. No. 18/102,688, filed Jan. 28, 2023, 49 pages, VMware, Inc.
Non-Published Commonly Owned U.S. Appl. No. 18/102,689, filed Jan. 28, 2023, 46 pages, VMware, Inc.
Taleb, Tarik, "D4.1 Mobile Network Cloud Component Design," Mobile Cloud Networking, Nov. 8, 2013, 210 pages, MobileCloud Networking Consortium, retrieved from http://www.mobile-cloud-networking.eu/site/index.php?process=download&id=127&code=89d30565cd2ce087d3f8e95f9ad683066510a61f.
Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/Luca_Valtulina_MSc_Report_final.pdf.
Non-Published Commonly Owned U.S. Appl. No. 18/222,864, filed Jul. 17, 2023, 350 pages, VMware, Inc.
Non-Published Commonly Owned U.S. Appl. No. 18/222,868, filed Jul. 17, 2023, 22 pages, VMware, Inc.
Non-Published Commonly Owned U.S. Appl. No. 18/224,466, filed Jul. 20, 2023, 56 pages, VMware, Inc.
Non-Published Commonly Owned U.S. Appl. No. 18/235,879, filed Aug. 20, 2023, 173 pages, VMware, Inc.
Author Unknown, "VeloCloud Administration Guide: VMware SD-WAN by VeloCloud 3.3," Month Unknown 2019, 366 pages, VMware, Inc., Palo Alto, CA, USA.
Non-Published Commonly Owned U.S. Appl. No. 18/137,584, filed Apr. 21, 2023, 57 pages, VMware, Inc.
Non-Published Commonly Owned U.S. Appl. No. 17/943,147, filed Sep. 12, 2022, 42 pages, Nicira, Inc.
Non-Published Commonly Owned U.S. Appl. No. 17/967,795, filed Oct. 17, 2022, 39 pages, VMware, Inc.
Non-Published Commonly Owned U.S. Appl. No. 17/976,784, filed Oct. 29, 2022, 55 pages, VMware, Inc.
Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.
Funabiki, Nobuo, et al., "A Frame Aggregation Extension of Routing Algorithm for Wireless Mesh Networks," 2014 Second International Symposium on Computing and Networking, Dec. 10-12, 2014, 5 pages, IEEE, Shizuoka, Japan.
Non-Published Commonly Owned U.S. Appl. No. 18/197,090, filed May 14, 2023, 36 pages, Nicira, Inc.
Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.
Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.
Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.
Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.
Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.
Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.
Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.
Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.
Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.
Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.
Guo, Xiangyi, et al., (U.S. Appl. 62/925,193), filed Oct. 23, 2019, 26 pages.
Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.
Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.
Lasserre, Marc, et al., "Framework for Data Center (DC) Network Virtualization," RFC 7365, Oct. 2014, 26 pages, IETF.
Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.
Lin, Weidong, et al., "Using Path Label Routing in Wide Area Software-Defined Networks with Open Flow," 2016 International Conference on Networking and Network Applications, Jul. 2016, 6 pages, IEEE.
Ong, Feng, "Research and Application of Cloud Storage Technology in University Information Service," Chinese Excellent Masters' Theses Full-text Database, Mar. 2013, 72 pages, China Academic Journals Electronic Publishing House, China.
Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.
Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.
Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.
Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.
Non-Published Commonly Owned U.S. Appl. No. 17/351,327, filed Jun. 18, 2021, 48 pages, VMware, Inc.

(56) References Cited

OTHER PUBLICATIONS

Non-Published Commonly Owned U.S. Appl. No. 17/351,342, filed Jun. 18, 2021, 47 pages, VMware, Inc.
Non-Published Commonly Owned U.S. Appl. No. 17/351,345, filed Jun. 18, 2021, 48 pages, VMware, Inc.
Non-Published Commonly Owned U.S. Appl. No. 17/384,735, filed Jul. 24, 2021, 62 pages, VMware, Inc.
Non-Published Commonly Owned U.S. Appl. No. 17/384,736, filed Jul. 24, 2021, 63 pages, VMware, Inc.
Non-Published Commonly Owned U.S. Appl. No. 17/384,738, filed Jul. 24, 2021, 62 pages, VMware, Inc.
Non-Published Commonly Owned U.S. Appl. No. 17/569,517, filed Jan. 6, 2022, 49 pages, VMware, Inc.
Non-Published Commonly Owned U.S. Appl. No. 17/569,519, filed Jan. 6, 2022, 48 pages, VMware, Inc.
Non-Published Commonly Owned U.S. Appl. No. 17/569,520, filed Jan. 6, 2022, 50 pages, VMware, Inc.
Non-Published Commonly Owned U.S. Appl. No. 17/569,522, filed Jan. 6, 2022, 48 pages, VMware, Inc.
Non-Published Commonly Owned U.S. Appl. No. 17/569,523, filed Jan. 6, 2022, 48 pages, VMware, Inc.
Non-Published Commonly Owned U.S. Appl. No. 17/569,524, filed Jan. 6, 2022, 48 pages, VMware, Inc.
Non-Published Commonly Owned U.S. Appl. No. 17/569,526, filed Jan. 6, 2022, 27 pages, VMware, Inc.
Non-Published Commonly Owned U.S. Appl. No. 17/574,225, filed Jan. 12, 2022, 56 pages, VMware, Inc.
Non-Published Commonly Owned U.S. Appl. No. 17/574,236, filed Jan. 12, 2022, 54 pages, VMware, Inc.
Non-Published Commonly Owned U.S. Appl. No. 17/827,972, filed May 30, 2022, 30 pages, Nicira, Inc.
Non-Published Commonly Owned U.S. Appl. No. 17/850,11, filed Jun. 27, 2022, 41 pages, Nicira, Inc.
Non-Published Commonly Owned U.S. Appl. No. 15/803,964, filed Nov. 6, 2017, 15 pages, The Mode Group.
Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.
Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.
Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.
Tootaghaj, Diman Zad, et al., "Homa: An Efficient Topology and Route Management Approach in SD-WAN Overlays," IEEE INFOCOM 2020—IEEE Conference on Computer Communications, Jul. 6-9, 2020, 10 pages, IEEE, Toronto, ON, Canada.
Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.
Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.
Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

\* cited by examiner

TRAFFIC PRIORITIZATION IN SD-WAN

BACKGROUND

Software-defined wide area networks (SD-WAN) are becoming increasingly common solutions for, e.g., connecting public and/or private cloud datacenters for an enterprise. In an SD-WAN deployment, an edge device typically connects through one or more secure connections with a gateway, with these connections traversing network links that connect the edge device with an external network. As an example, a branch office of an enterprise might operate an SD-WAN edge device that connects to a gateway at an on-premises datacenter. These SD-WANs can handle data traffic for enterprise applications but will often also handle broadband cellular traffic (e.g., 4G or 5G traffic). This broadband cellular traffic will often have its own internal specifications that are opaque to the typical SD-WAN edge or gateway device.

BRIEF SUMMARY

Some embodiments provide a method for an SD-WAN that handles both traffic for a cellular broadband (e.g., 5G) network as well as traffic outside of the cellular broadband network to intelligently prioritize different types of cellular broadband traffic. When an edge device of the SD-WAN receives a data message, the edge device can determine (e.g., by looking at an Internet Protocol (IP) header of the data message) whether the data message is cellular broadband traffic or not and prioritize the traffic relative to other types of traffic. In addition, if the data message is a cellular broadband data message, the edge device of some embodiments examines a set of header fields of a particular type of tunnel header (e.g., a general packet radio service (GPRS) tunneling protocol (GTP) header) associated with the cellular broadband network. Based on the examination of the set of header fields, the edge device identifies a specified traffic priority applicable to the data message and applies that traffic priority to the data message within the SD-WAN.

The application of the traffic priority helps to ensure end-to-end application of the traffic priority specified for the data message by the cellular broadband network. Thus, for example, the SD-WAN will not result in the deprioritization of latency-sensitive user traffic for cellular broadband applications such as automated vehicles, drones, etc. Similarly, cellular broadband control traffic (e.g., traffic between components of a distributed radio access network) may be latency-sensitive, so the SD-WAN will also avoid deprioritizing this traffic.

The SD-WAN of some embodiments may carry cellular broadband traffic in various different situations. For instance, a large retail store with several locations might deploy an SD-WAN that connects these various locations to each other, to a centralized datacenter, and to other external networks. The edge devices at such a location will process SD-WAN traffic relating to various enterprise applications such as billing, inventory, etc. (e.g., sent from various desktop and/or laptop computers, virtual machines, etc.) at the location in addition to various types of cellular broadband traffic.

In addition, the SD-WAN may carry cellular broadband messages at different locations within the cellular broadband network. A cellular broadband message sent by an endpoint device (commonly referred to as user equipment, or UE), for example, typically travels from the endpoint device to a base station. The base station traditionally includes the radio access network (RAN), though the RAN may be distributed in some cases as described in the Open RAN (O-RAN) standard. After RAN processing, the message is then sent to the packet core. In some embodiments, the SD-WAN handles the cellular broadband messages between the RAN and the packet core, with the edge device located at the RAN and the gateway device located at the packet core. In this case, the edge device processes the cellular broadband message after RAN processing is completed and the gateway device processes the message prior to the message being handled by the packet core.

The SD-WAN of some embodiments may instead handle traffic between components of the distributed RAN. In the O-RAN, RAN components may execute in a cloud rather than directly at the base station, and the SD-WAN handles traffic (e.g., control traffic) between different RAN components (e.g., between the distributed unit and the centralized unit). Similarly, the SD-WAN of some embodiments handles traffic between two different RAN instances (e.g., when a mobile device is handed off from one base station to another).

To identify the traffic priority for a cellular broadband message, the edge device is configured in some embodiments to examine fields beyond just the IP header of the message. Specifically, 5G messages processed by an SD-WAN edge typically include (among other headers) an outer (underlay) IP header, a GTP header, and an inner (overlay) IP header. Within the GTP header, a tunnel endpoint identifier field identifies the GTP tunnel (i.e., encompassing both tunnel endpoints) for a protocol data unit (PDU) session. A single PDU session may include numerous flows, and thus the GTP header may include an extension header that, among other fields, can specify a quality of service (QoS) flow identifier (QFI). This QFI may be used to map to a specific QoS level (e.g., a specific 5G QoS Identifier (5QI)). This QoS level in turn maps to a specific set of characteristics that must be met for the packet, including a priority level, packet delay, packet error rate, etc. With the edge device configured to examine the GTP header, the edge device can enforce these QoS characteristics within the SD-WAN.

In addition, to avoid the need to review the GTP header for each data message in a flow, in some embodiments the edge device stores a mapping of an identifier for the flow to the identifier for the set of QoS characteristics. The flow identifier of some embodiments includes only IP and/or transport layer (e.g., TCP, UDP, etc.) header fields. For instance, in some embodiments the flow identifier includes the outer IP header fields, inner IP header fields, and one or more transport layer port numbers (e.g., source and/or destination port numbers) from the inner and/or outer transport layer header.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for an SD-WAN that handles both traffic for a cellular broadband (e.g., 5G) network as well as traffic outside of the cellular broadband network to intelligently prioritize different types of cellular broadband traffic. When an edge device of the SD-WAN receives a data message, the edge device can determine (e.g., by looking at an Internet Protocol (IP) header of the data message) whether the data message is cellular broadband traffic or not and prioritize the traffic relative to other types of traffic. In addition, if the data message is a cellular broadband data message, the edge device of some embodiments examines a set of header fields of a particular type of tunnel header (e.g., a general packet radio service (GPRS) tunneling protocol (GTP) header) associated with the cellular broadband network. Based on the examination of the set of header fields, the edge device identifies a specified traffic priority applicable to the data message and applies that traffic priority to the data message within the SD-WAN.

The application of the traffic priority helps to ensure end-to-end application of the traffic priority specified for the data message by the cellular broadband network. Thus, for example, the SD-WAN will not result in the deprioritization of latency-sensitive user traffic for cellular broadband applications such as automated vehicles, drones, etc. Similarly, cellular broadband control traffic (e.g., traffic between components of a distributed radio access network) may be latency-sensitive, so the SD-WAN will also avoid deprioritizing this traffic.

Figure 1:
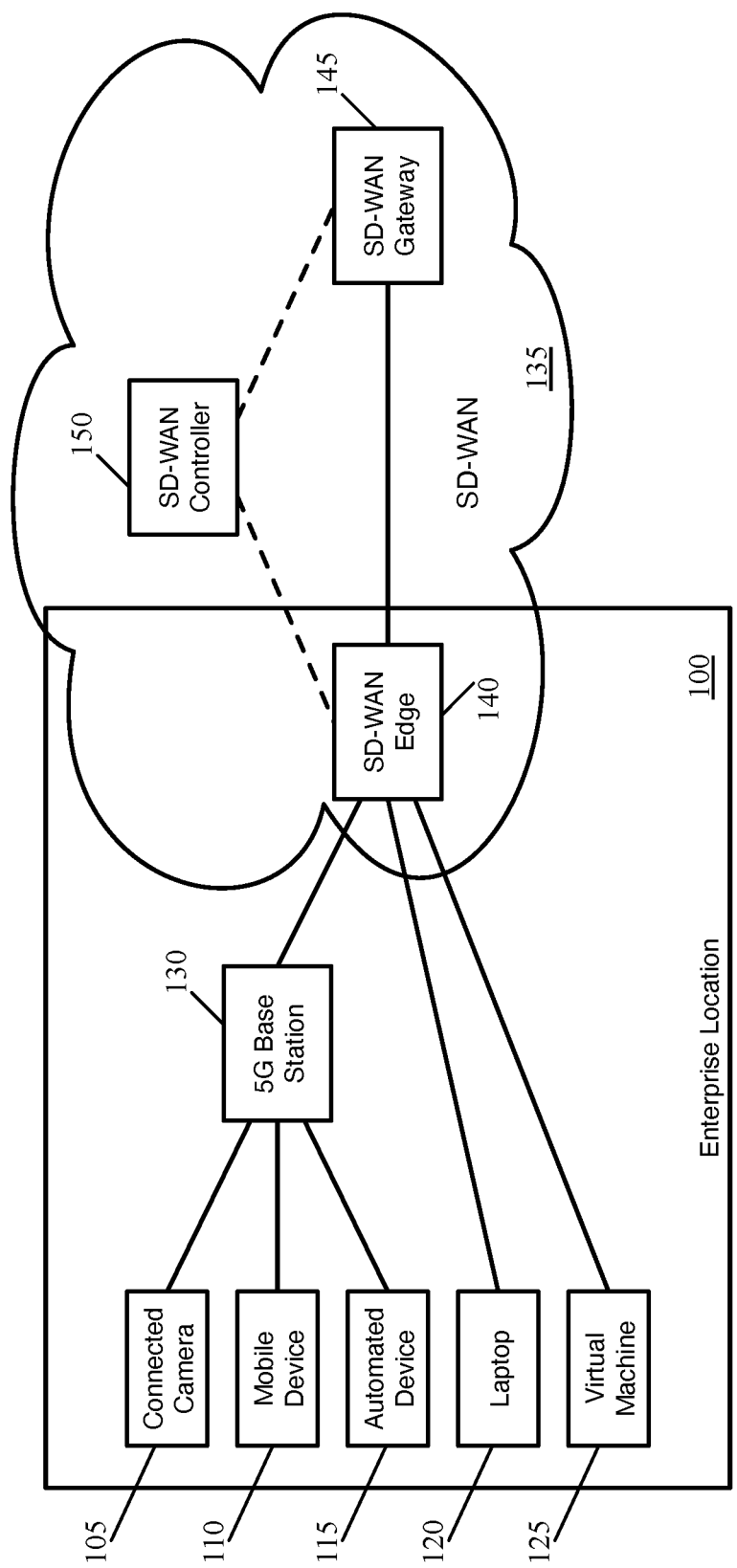
FIG. 1 conceptually illustrates an example of a situation in which an SD-WAN also carries cellular broadband traffic.

FIG. 1 conceptually illustrates an example of a situation in which an SD-WAN also carries cellular broadband traffic (specifically, 5G traffic). It should be understood that while much of the discussion in this application refers specifically to 5G traffic, similar concepts apply to other cellular broadband traffic, such as 3G, 4G, etc. In the example of FIG. 1, numerous connected endpoint devices 105-125 operate at an enterprise location 100. The enterprise location 100 could be, e.g., a retail store (e.g., a department store, a home improvement retailer, a supercenter, etc.), a manufacturing plant, a hospital, a research organization, etc.

In this example, the connected endpoint devices include a connected camera 105, a mobile device 110 (e.g., a smart phone, a tablet, etc.), an automated device 115 (e.g., automated manufacturing equipment, a self-driving vehicle, etc.), a laptop 120, and a virtual machine 125. Three of these devices 105-115 are 5G devices that connect to a 5G base station 130 (e.g., a 5G small cell that operates within the enterprise location 100), while two of the devices 120-125 connect via wired (e.g., Ethernet) or wireless (e.g., 802.11 Wi-Fi) forms of connectivity. In many situations, various other types of connected devices (both 5G devices and non-5G devices) will operate within such an environment. Examples of such 5G devices include remote surgery equipment, remote controlled drones, smart watches, health monitoring equipment, Internet of Things (IoT) appliances, etc., while other non-5G devices could include desktop computers, servers, containers, etc.

Both the 5G base station 130 and the other forms of communication communicate externally via a software-defined wide area network (SD-WAN) 135. This communication includes enterprise application traffic (for billing, inventory, etc.) from the laptop 120 and/or virtual machine 125 as well as various types of 5G traffic (e.g., 5G voice traffic and/or 5G Internet traffic). The SD-WAN 135 of some embodiments may be used to connect multiple branch sites (e.g., the enterprise location 100) to at least one datacenter hub. In this example, the SD-WAN includes at least an edge device 140, a gateway 145, and a controller 150, though in many cases an SD-WAN will include multiple edge devices (e.g., for each of many branch offices, retail locations, etc.), multiple gateways, and/or a hub.

The SD-WAN edge device 140 may be a virtual machine, a container, a program executing on a physical or virtual machine, a stand-alone appliance, etc., that operates at the enterprise location 100 to connect the devices at that location to other devices, hubs, etc. in the SD-WAN or connected to the SD-WAN. Though shown as a single edge 140, this represents a high-availability pair or cluster in some embodiments.

The edge device 140 (and, in many cases, other edge devices of the SD-WAN) exchanges data traffic with the SD-WAN gateway 145 through one or more connection links (e.g., a cable modem link, a fiber optic link, and/or an MPLS link, etc.). The gateway 145 (or a hub, which is not shown in this figure) connects the edge device 140 to other edges (e.g., at other enterprise locations). The gateway 145 may be located in an on-premises datacenter (e.g., a primary datacenter for an enterprise). In some embodiments, traffic from the endpoint devices 105-125 at the enterprise location 100 that is directed externally (e.g., to external destinations not associated with the enterprise location) is routed through the SD-WAN to the gateway 145 before being sent through a public network to its external destination. This includes the 5G traffic from the devices 105-115.

The controller 150, which may be a single controller or a cluster of controllers, serves as a central point for managing (e.g., defining and modifying) configuration data that is provided to the edge 140 and gateway 145, as well as any other SD-WAN nodes (e.g., other edges, hubs, gateways, etc.), to configure some or all of the operations of these SD-WAN nodes. The controller 150 may be located in a private datacenter (e.g., a primary enterprise datacenter) or in a public cloud datacenter (or in multiple datacenters, if operating as a cluster). In some embodiments, the controller 150 actually includes a set of manager servers that define and modify the configuration data, and a set of controller servers that distribute the configuration data to the edge 140, gateway 145, and any other SD-WAN nodes. The configuration data provided to the edge 140 may include routing information (e.g., directing the edge 140 to route data to the gateway 145) as well as tunneling information, quality of service (QoS) configuration information, etc.

Because the 5G base station 130 is located within the enterprise location 100, the SD-WAN 135 is used to carry 5G traffic between the base station 130 and other components of the 5G network. User data traffic from the endpoint devices 105-115 may need to travel to the 5G packet core, traffic may need to be sent from the base station 130 to another base station, a radio access network (RAN) component at the base station 130 may communicate with another RAN component located in a public cloud, etc.

Figure 2:
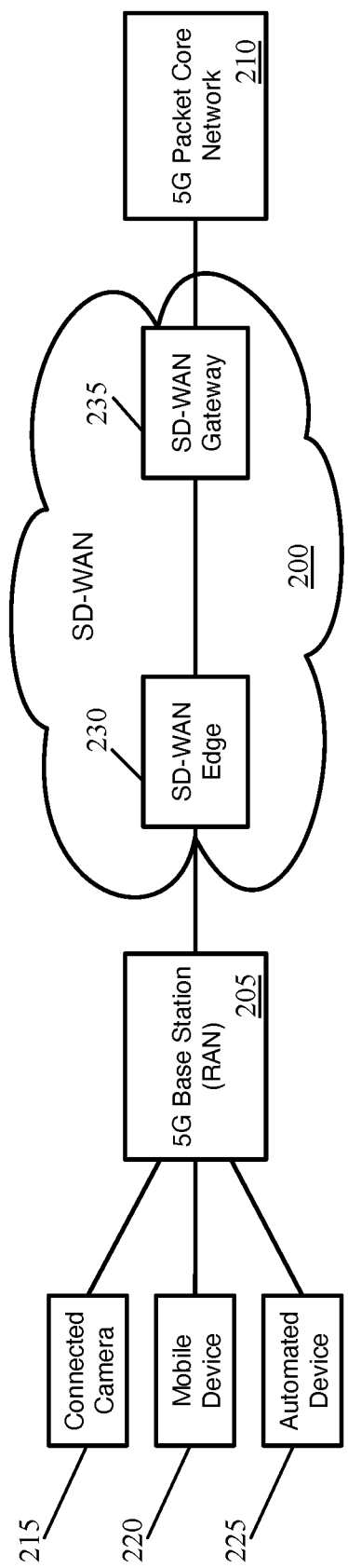
FIG. 2 conceptually illustrates an example of an SD-WAN being situated between the 5G RAN and the 5G packet core.

FIG. 2 conceptually illustrates an example of an SD-WAN 200 being situated between the 5G RAN 205 and the 5G packet core 210. The 5G network, like previous cellular broadband networks, includes a RAN that is often situated at each base station of the 5G network as well as a packet core, both of which are typically operated by a mobile provider. The RAN 205 implements the radio access technology that allows endpoint devices to wirelessly connect to the 5G network and is generally the access point for these devices. For a cellular broadband network, there are typically many RANs (e.g., at each base station, which serve separate (though often partially overlapping) geographic areas. The packet core is a more centralized network of the mobile provider (though this core may also be implemented in a distributed manner in multiple public and/or private clouds). In some embodiments, the packet core applies various network functions (e.g., load balancing, firewall, etc.) to 5G data messages.

In the example of FIG. 2, traffic from the devices 215-225 that connect to the 5G base station 205 have RAN processing applied and are then sent to the packet core 210. However, for data messages to reach the packet core 210, these data messages must pass through the SD-WAN 200. Thus, the edge device 230 processes this traffic after RAN processing and tunnels the traffic to the gateway device 235, which processes the traffic prior to handing the traffic to the packet core 210.

Figure 3:
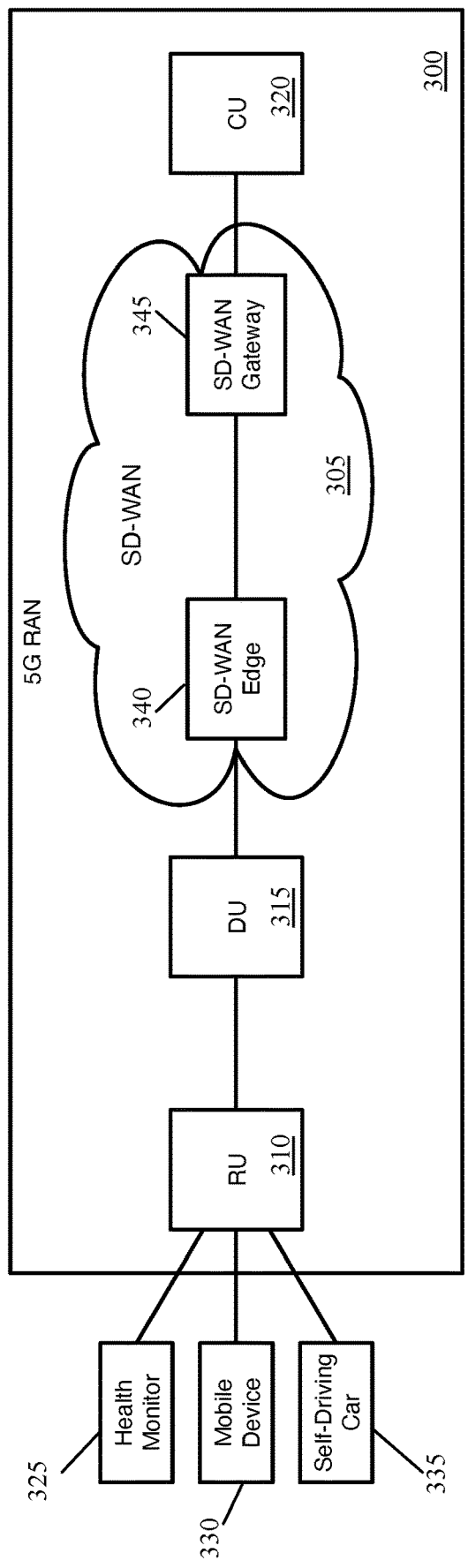
FIG. 3, on the other hand, illustrates a case when traffic within a RAN passes through an SD-WAN.

FIG. 3, on the other hand, illustrates a case when traffic within a RAN 300 passes through an SD-WAN 305. In many cases, the distributed unit (DU) of a RAN is located at the base station along with a radio unit (RU), while the centralized unit (CU) may be located in a cloud and control numerous DUs. The RU 310, in some embodiments, provides functions such as analog to digital conversion, filtering, power amplification, and TX/RX, and may be integrated with the antenna of a base station. The DU 315, in some embodiments, provides digital processing, including signal modulation, encoding, scheduling, and other functions. The CU 320 provides radio resource control and packet data convergence protocol layers. In addition to communication from endpoint devices 325-335 being sent through the RAN 300 and therefore from the DU 315 through the SD-WAN 305 to the CU 320, control communications are often sent between the DU 315 and the CU 320 as well. In this case, for messages to reach the CU 320 from the DU 315, these messages must pass through the SD-WAN 305. Thus, the edge device 340 processes this traffic after the DU 315 and tunnels the traffic to the gateway device 345, which processes the traffic prior to sending the traffic to the CU 320.

Figure 4:
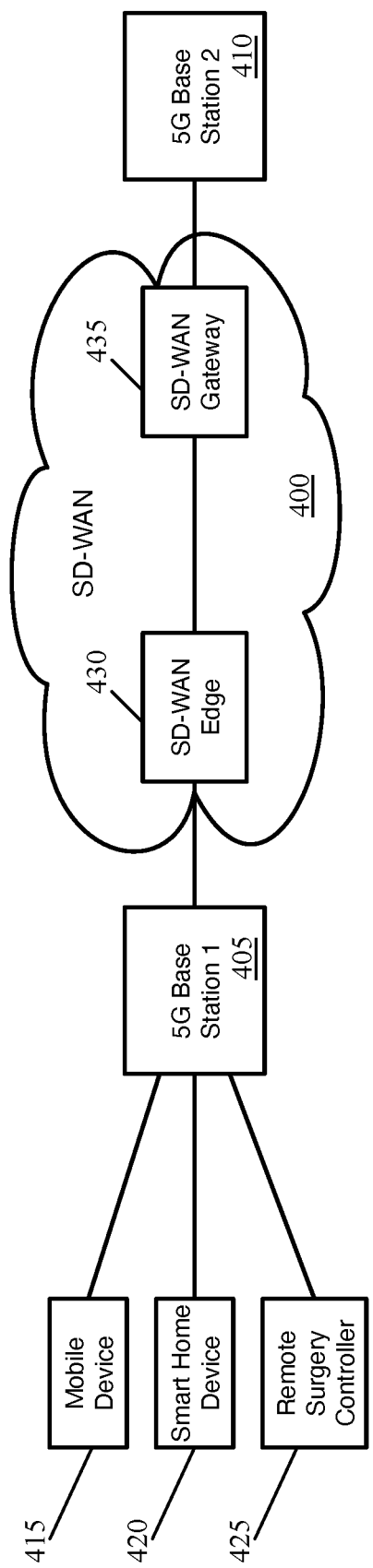
FIG. 4 illustrates the case of traffic between two 5G base stations being carried through an SD-WAN.

FIG. 4 illustrates the case of traffic between two 5G base stations 405 and 410 being carried through an SD-WAN 400. The X2 interface defines communication between base stations. These communications can include user data or signaling information. For instance, one base station communicates with another when handling handover of a device from one base station to another (e.g., because that device is in motion and moves from the geographic area of the first base station to the geographic area of the second base station). In the figure, the mobile device 415 is more likely to cause such communication between the base stations 405 and 410 than either the smart home device 420 or the remote surgery controller 425, as the latter two endpoint devices are more likely to be static. Like the two previous examples, in order for X2 messages to be sent from the first 5G base station 405 to the second 5G base station 410, the edge device 430 processes this traffic after the first base station 405 and tunnels the traffic to the gateway device 435, which processes the traffic prior to sending the traffic to the second base station 410.

Other 5G traffic might pass through an SD-WAN as well, in some embodiments. For instance, Open RAN (O-RAN) implementations can push many of the RAN functionalities (e.g., DU and/or CU operations) to a near-real-time RAN intelligent controller (RIC), which hosts applications (referred to as xApps). Communication on the E2 interface between the CU and DU components and the near-real-time RIC, as well as between RIC components and the xApps or between xApps, may be very latency-sensitive while passing through an SD-WAN. Further detail about the near-real-time RIC, xApps, and messages between these components can be found in U.S. patent Ser. No. 17/384,777, filed Jul. 25, 2021, which is incorporated herein by reference.

Many of these examples of 5G traffic have extremely low latency requirements. Applications like remote surgery, automated cars or manufacturing, remote machinery control, as well as various types of control messaging, require very high quality of service and cannot be caught up in delays that could occur if there is a bottleneck in the SD-WAN (e.g., if other non-5G traffic increases for a period of time). However, the edge nodes in SD-WAN deployments generally prioritize traffic based on the standard network layer (e.g., IP) data message headers (e.g., by examining the differentiated services code point (DSCP) field) in order to differentiate between traffic. While this can work in some cases to differentiate 5G traffic from other traffic, not all 5G traffic should be given the same priority. For instance, remote surgery or automated vehicle traffic should have a higher priority than mobile phone web browsing.

Figure 5:
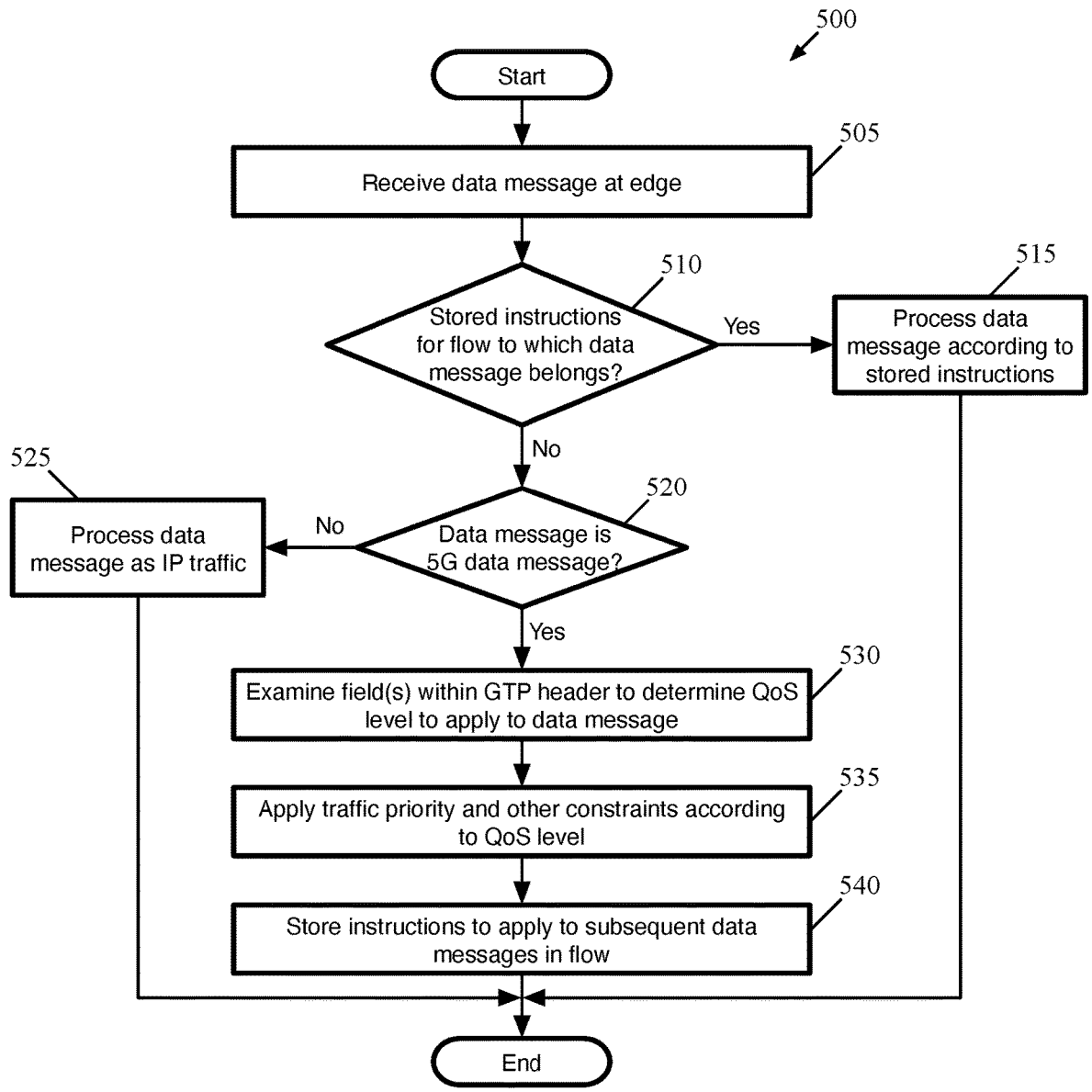
FIG. 5 conceptually illustrates a process of some embodiments for applying different traffic priorities to different types of traffic, including different types of 5G traffic.

Therefore, to identify the traffic priority for a cellular broadband message, the SD-WAN edge device is configured in some embodiments (e.g., by the SD-WAN controller) to examine fields beyond just the IP header of the message. FIG. 5 conceptually illustrates a process 500 of some embodiments for applying different traffic priorities to different types of traffic, including different types of 5G traffic. The process 500 is performed by an SD-WAN edge node in some embodiments (e.g., by an SD-WAN edge) that handles 5G traffic in addition to non-5G traffic. In some embodiments, SD-WAN gateways also perform similar operations (e.g., for reverse direction traffic).

As shown, the process 500 begins by receiving (at 505) a data message at the edge device. In some embodiments, this is a data message with an outer IP header. Internally, the data message may be a 5G user data message, a 5G control message, a non-5G message (e.g., an enterprise application message, etc.).

The process 500 determines (at 510) whether stored instructions exist for the flow to which the data message belongs. In some embodiments, the edge device stores a mapping of flow identifiers to processing instructions, which include QoS level information as well as forwarding instructions. The flow identifier of some embodiments includes only IP and/or transport layer (e.g., TCP, UDP, etc.) fields, so that for these data messages the edge device does not need to examine any of the other fields. For instance, in some embodiments the flow identifier includes IP header fields and/or transport layer port numbers (e.g., source and/or destination port numbers) of an outer (encapsulation) header. Some embodiments also include IP and/or transport layer fields from an inner (overlay network) header. As described below, when a data message from a new flow is received and processed, the edge device stores a mapping of the flow identifier for that flow to processing instructions for the flow.

If instructions are stored for the flow to which the received data message belongs, then the process 500 processes (at 515) the data message according to the stored instructions. As mentioned, in addition to specifying forwarding instructions (e.g., routing) for the data message, the stored instructions also indicate a priority for the data message and other QoS-related instructions (e.g., the maximum allowable delay, etc.). This priority may be used by the edge device to schedule transmission of the processed data message relative to other data messages with different priorities. The process 500 then ends.

On the other hand, if no instructions are stored for the flow (e.g., because the data message is the first message in a new flow), the process 500 determines (at 520) whether the data message is a 5G data message. In some embodiments, the edge device can identify a data message as a 5G data message based on a DSCP marking or by identifying the presence of a tunnel header of a particular type associated with 5G data messages (e.g., a GTP header).

If the data message is not a 5G data message, then the process 500 processes (at 525) the data message as IP traffic, using any forwarding and traffic priority configuration configured for the edge device by the SD-WAN controller. This processing can differentiate between different applications based on various factors. For instance, an administrator could configure the SD-WAN to assign higher priority to certain enterprise applications that require lower latency as compared to less latency-sensitive applications (e.g., billing). The process then ends.

When the received data message is a 5G message, the process 500 examines (at 535) a set of fields within the GTP header to determine a QoS level to apply to the data message. In some embodiments, a GTP header includes, among other fields, a tunnel endpoint identifier (TEID) field. This TEID field specifies a tunnel and therefore conveys both endpoints of the tunnel rather than using a separate field for the source and destination tunnel. However, the TEID field on its own is not enough to determine the QoS level, as each GTP tunnel maps to a protocol data unit (PDU) session, which itself may contain numerous separate flows that should be treated differently. The GTP tunnel, in some embodiments, provides connectivity between the endpoint device (UE) and a destination network (e.g., the Internet or a private corporate network). Other fields typically found in the GTP header include a version field, a protocol type extension header flag, a sequence number flag, an N-PDU number flag, a message type, a length, and an extension header type.

Figure 6:
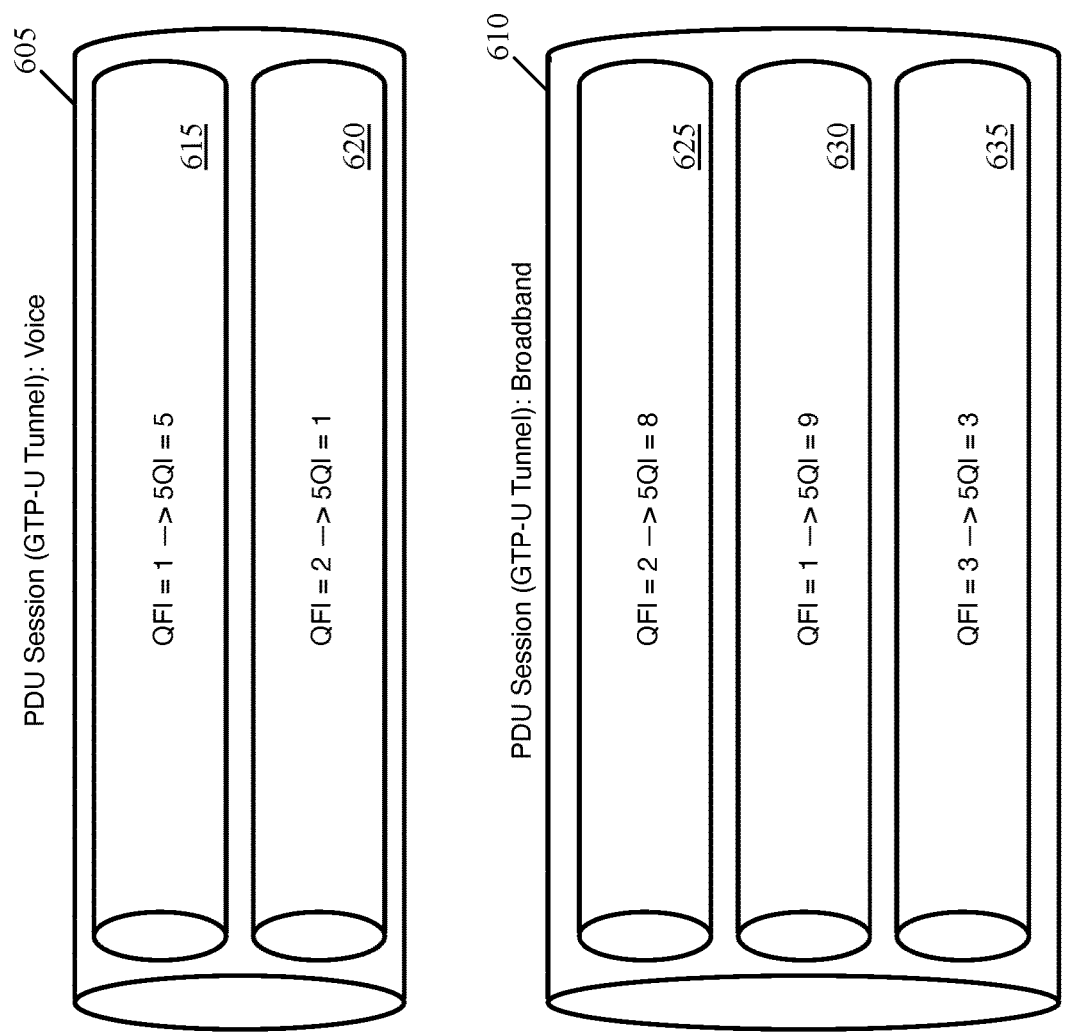
FIG. 6 conceptually illustrates a pair of PDU sessions for an endpoint device that illustrate how multiple flows are contained within a single PDU session.

FIG. 6 conceptually illustrates a pair of PDU sessions (GTP-U tunnels) for an endpoint device that illustrate how multiple flows (e.g., for different applications) are contained within a single PDU session. A first PDU session 605 is used for "voice" applications, which can include flows for videoconferencing, conversational voice (telephone), push-to-talk, and short message service (SMS), among other traffic. A second PDU session 610 is used for broadband applications, which can include flows for a multitude of different applications depending on the sort of endpoint device initiating the PDU session, including web browsing, connected camera, automated vehicle applications, health monitoring applications, smart home applications, etc.

While DSCP marking can be associated with a PDU session in some embodiments, this does not help differentiate between the different flows within a PDU session. Thus, the edge device is configured in some embodiments to examine additional information within the GTP header that provides additional information about the particular flow to which a data message belongs. In some embodiments, an extension header within the GTP header includes a PDU session container header, which in turn includes a QoS flow identifier (QFI) field. This QFI field can be used to differentiate between different flows and even to map to a particular QoS level that should be applied. In FIG. 6, for example, the voice PDU session 605 includes two different flows: a first flow 615 identified by a QFI value of 1 and a second flow 620 identified by a QFI value of 2. The broadband PDU session 610 includes three flows: a first flow 625 identified by a QFI value of 2, a second flow 630 identified by a QFI value of 1, and a third flow 635 identified by a QFI value of 3. It should be noted that the QFI values need not be assigned starting from 1 and increasing as flows are added to a PDU session; rather, the flow identifier is assigned to correspond to a type of application in some embodiments. In addition, as evidence by this example, the same QFI can be used (and have a different meaning) within a voice PDU session and a broadband PDU session.

The edge device is configured to map the QFI to a QoS level in some embodiments. In some such embodiments, the QoS level is determined according to a 5G QoS identifier (5QI) value, which itself maps to a specific set of QoS characteristics. In the example shown in FIG. 6, the first flow 615 is mapped (based on a QFI of 1) to a 5QI value of 5 and the second flow 620 is mapped (based on a QFI of 2) to a 5QI value of 1. For the broadband flows, the first flow 625 is mapped (based on a QFI of 2) to a 5QI value of 8, the second flow 630 is mapped (based on a QFI of 1) to a 5QI value of 9, and the third flow 635 is mapped (based on a QFI of 3) to a 5QI value of 3.

In some embodiments, rather than using the QFI field, the edge device is configured to use a service class identifier (SCI) field, which is also part of the GTP extension header. A large range of this SCI field is unassigned and can be customized, so the SD-WAN edge can be customized to map SCI values to QoS levels (e.g., to 5QI values). In various embodiments, the edge device classifies traffic into different QoS levels based on some combination of the TEID, transport layer port numbers (e.g., from the outer or inner header), the QFI, DSCP marking in the outer IP header, and the SCI. In addition, in some embodiments, a RAN container (or new radio (NR) RAN container) field within the extension header may be used to classify front haul traffic vs. backhaul traffic and prioritize traffic for distributed RAN solutions between X2-U, Xn-U, and F1-U user plane interfaces. Finally, the PDU session container is used in some embodiments to classify backhaul traffic to N3 and N9 user plane interfaces, between NG-RAN and user plane function (UPF), or between two UPFs.

Returning to FIG. 5, the process 500 applies (at 535) the traffic priority and other constraints according to the identified QoS level. In some embodiments, 5QI values map to both guaranteed bit-rate (including delay-critical guaranteed bit-rate) as well as non-guaranteed bit-rate processing. The 5QI values, in addition, map to a priority level, a packet delay budget, a packet error rate, a maximum data burst volume, and a default averaging window. Thus, the 5QI value enables the edge device to treat traffic for different 5G applications differently, depending on the requirements of that application. As part of processing the data message, the edge device also performs forwarding (e.g., routing of the data message) and outputs the data message (e.g., via an SD-WAN link).

Because instructions were not previously stored, the process 500 then stores (at 540) instructions to apply to subsequent data messages in the flow. In some embodiments, the edge device stores a mapping of flow identifiers to processing instructions (e.g., the QoS level information as well as forwarding instructions). As described above, the flow identifier of some embodiments includes IP header fields and/or transport layer port numbers (e.g., source and/or destination port numbers) of an outer (encapsulation) header and/or from an inner (overlay network) header. The process 500 then ends.

Figure 7:
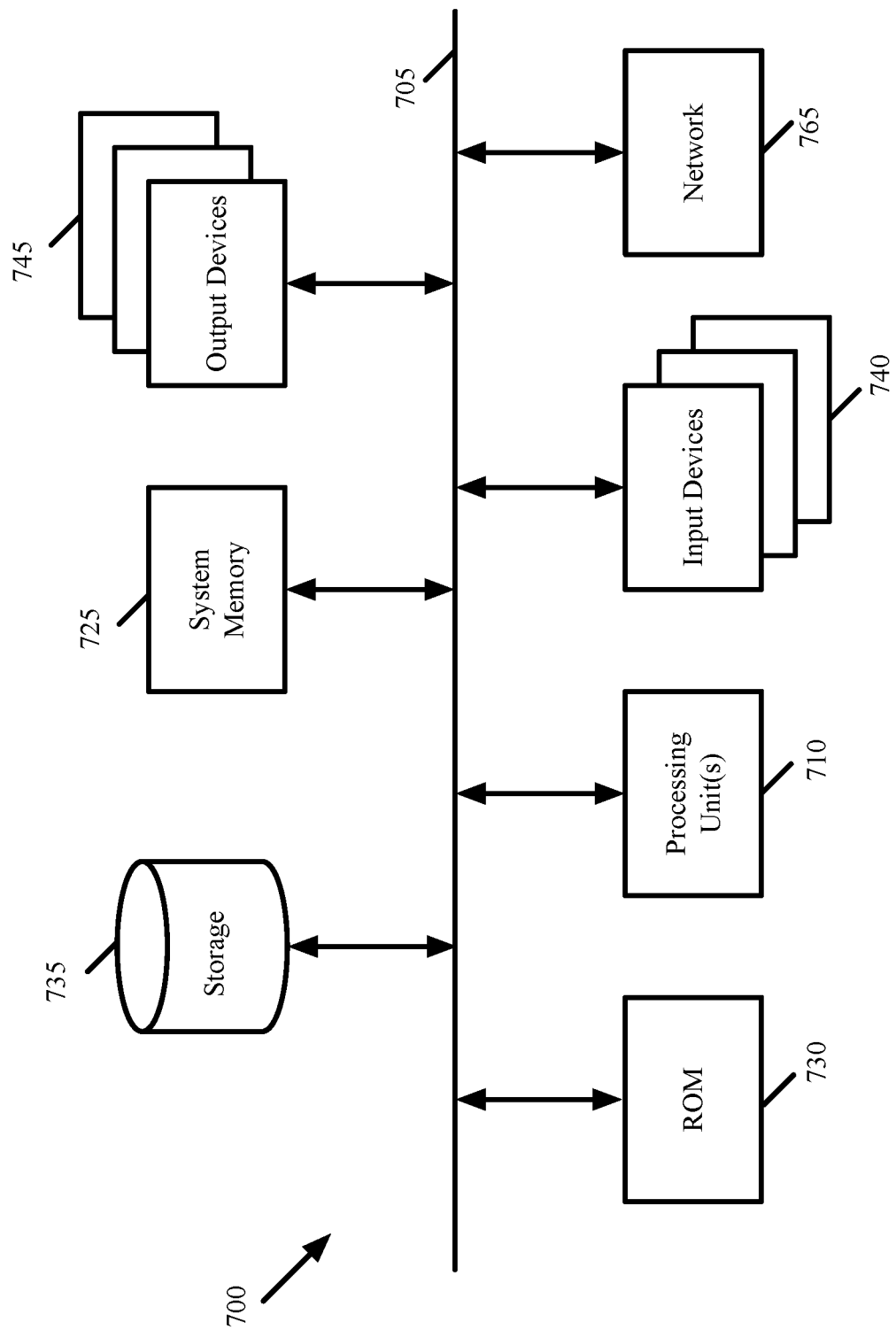
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random-access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a software-defined wide area network (SD-WAN) that handles (i) traffic for a 5G network and (ii) traffic outside of the 5G network, the SD-WAN established by a set of edge nodes and a set of gateways, a method comprising:
   at a particular edge node of the SD-WAN:
   identifying whether a received data message is a 5G message that includes a tunnel header of a particular type associated with the 5G network;
   when the data message is a 5G message, examining a set of header fields within the tunnel header to identify a specified traffic priority applicable to the 5G message; and
   applying the identified traffic priority within the SD-WAN.

2. The method of claim 1, wherein applying the identified traffic priority within the SD-WAN ensures end-to-end application of the traffic priority specified for the 5G data message.

3. The method of claim 1, wherein the SD-WAN handles 5G network traffic between a radio access network (RAN) and a packet core network of the 5G network.

4. The method of claim 3, wherein:
   the particular edge node receives the 5G message after processing of the data message by the RAN; and
   the particular edge node transmits the 5G message to one of the gateways of the SD-WAN that processes the data message prior to processing by the packet core network.

5. The method of claim 4, wherein the particular edge node is located at the RAN and the gateway is located at the packet core network.

6. The method of claim 1, wherein the SD-WAN handles 5G network traffic between a first distributed RAN component and a second distributed RAN component.

7. The method of claim 1, wherein the SD-WAN handles 5G network traffic between a first base station and a second base station.

8. The method of claim 1, wherein the particular edge node operates within an enterprise network to handle enterprise application traffic outside of the 5G network in addition to 5G network traffic for enterprise users.

9. The method of claim 1, wherein the tunnel header is a general packet radio service (GPRS) tunneling protocol (GTP) header.

10. The method of claim 9, wherein examining the set of header fields comprises identifying a value of a quality of service (QoS) flow identifier (QFI) field within the GTP header, wherein different values of the QFI field map to different traffic priorities.

11. The method of claim 1 further comprising:
   storing a mapping between a flow identifier to which the data message belongs and the identified traffic priority; and
   applying the identified traffic priority to subsequent data messages belonging to the flow without examining the set of header fields within the tunnel headers of the subsequent data messages.

12. The method of claim 11, wherein the flow identifier comprises a set of underlay network addresses and a set of overlay network addresses.

13. A non-transitory machine readable medium storing a program for a particular edge node of a software-defined wide area network (SD-WAN) that handles (i) traffic for a 5G network and (ii) traffic outside of the 5G network, the SD-WAN established by a set of edge nodes and a set of gateways, the program comprising sets of instructions for:
   identifying whether a received data message is a 5G message that includes a tunnel header of a particular type associated with the 5G network;

when the data message is a 5G message, examining a set of header fields within the tunnel header to identify a specified traffic priority applicable to the 5G message; and applying the identified traffic priority within the SD-WAN.

14. The non-transitory machine readable medium of claim 13, wherein application of the identified traffic priority within the SD-WAN ensures end-to-end application of the traffic priority specified for the 5G data message.

15. The non-transitory machine readable medium of claim 13, wherein the SD-WAN handles 5G network traffic between a radio access network (RAN) and a packet core network of the 5G network.

16. The non-transitory machine readable medium of claim 15, wherein:
the particular edge node receives the 5G message after processing of the data message by the RAN; and
the particular edge node transmits the 5G message to one of the gateways of the SD-WAN that processes the data message prior to processing by the packet core network.

17. The non-transitory machine readable medium of claim 16, wherein the particular edge node is located at the RAN and the gateway is located at the packet core network.

18. The non-transitory machine readable medium of claim 13, wherein the SD-WAN handles 5G network traffic between a first distributed RAN component and a second distributed RAN component.

19. The non-transitory machine readable medium of claim 13, wherein the SD-WAN handles 5G network traffic between a first base station and a second base station.

20. The non-transitory machine readable medium of claim 13, wherein the particular edge node operates within an enterprise network to handle enterprise application traffic outside of the 5G network in addition to 5G network traffic for enterprise users.

21. The non-transitory machine readable medium of claim 13, wherein the tunnel header is a general packet radio service (GPRS) tunneling protocol (GTP) header.

22. The non-transitory machine readable medium of claim 21, wherein the set of instructions for examining the set of header fields comprises a set of instructions for identifying a value of a quality of service (QoS) flow identifier (QFI) field within the GTP header, wherein different values of the QFI field map to different traffic priorities.

23. The non-transitory machine readable medium of claim 13, wherein the program further comprises sets of instructions for:
storing a mapping between a flow identifier to which the data message belongs and the identified traffic priority; and
applying the identified traffic priority to subsequent data messages belonging to the flow without examining the set of header fields within the tunnel headers of the subsequent data messages.

24. The non-transitory machine readable medium of claim 23, wherein the flow identifier comprises a set of underlay network addresses and a set of overlay network addresses.

* * * * *